C. KOHLER.
WATER COOLING APPARATUS.
APPLICATION FILED JAN. 12, 1920.

1,371,628. Patented Mar. 15, 1921.

Inventor:
Conrad Kohler
By Henry Ortly Jr
Atty

UNITED STATES PATENT OFFICE.

CONRAD KOHLER, OF ZURICH, SWITZERLAND.

WATER-COOLING APPARATUS.

1,371,628. Specification of Letters Patent. Patented Mar. 15, 1921.

Application filed January 12, 1920. Serial No. 350,902.

*To all whom it may concern:*

Be it known that I, CONRAD KOHLER, a citizen of the Republic of Switzerland, residing at Zurich, Hardturmstrasse 19, Switzerland, have invented certain new and useful Improvements in Water-Cooling Apparatus; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to a method and device for recooling the cooling water of a condensing plant on steam driven vehicles by means of an air current, produced in a longitudinally arranged channel by the speed of the vehicle.

The hitherto known contrivances for recooling on steam driven vehicles have the disadvantage that the water-distributer arranged above the cooling zone has been provided with either a small number of holes with comparatively large individual cross-sectional areas or with many holes with comparatively small individual cross-sectional areas. In the first instance the water is not distributed well enough and offers too little surface to the air, whereby the total cooling effect is too small; in the second instance the danger exists that the openings may be choked by impurities. Furthermore the designer of such contrivances is in doubt whether to have the water distributer supplied with pressure above atmospheric or not. If he supplies the water with pressure above atmospheric, it squirts out of the openings with a considerable velocity and flows through the cooling zone in too short a time, because the velocity of the fall increases continuously and progressively. If one does not generate a pressure above the atmospheric in the distributer or does not even have it properly filled, the danger exists that at the varying speeds of the vehicle or at changing gradients sometimes the front openings and sometimes the openings in the rear of the distributer are not supplied with water whereby the re-cooling device does not work with the desired efficiency. There are already known devices for re-cooling in which baffle-plates, lattice-work and similar obstacles are arranged for the purpose of effecting a retardation of the fall of the cooling water; this has been, however, done to such an extent, that the air current and with it the cooling effect were hindered. All these disadvantages are overcome by the present invention.

According to the invention the water is supplied to a distributer provided with openings and arranged above the channel, at a pressure above atmospheric in order to prevent the discharge openings from getting choked, thereafter the velocity of the water is retarded and a further distribution effected by means of a horizontal strainer plate arranged in the cooling zone and which is provided with considerably larger and considerably more openings than the distributer. Said strainer plate may be constructed so that the plurality of its openings is of a total cross-sectional area which is at least twice as large as the total cross-section of the same number of the distributer openings. Such a strainer plate may be provided in the upper third of the cooling zone and a second strainer plate at about half of the height of the cooling zone. Finally such a strainer plate may be slightly raised from the entrance of the air toward the rear. The various advantages of the device are explained hereinafter on describing the exemplification of this invention shown in the drawing.

Figure 1:
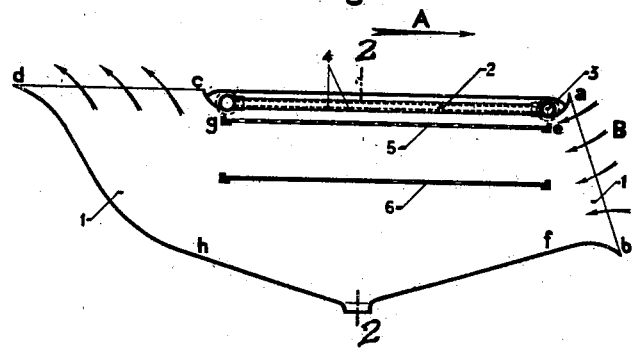
Figure 1 is a vertical longitudinal section through a re-cooling device intended for a steam locomotive.
Figure 2:
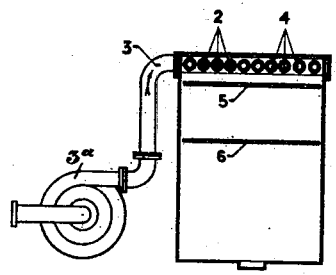
Fig. 2 is a vertical section on line 2—2 of Fig. 1.

The vehicle moves in the direction of the arrow A, *i. e.* from left to right. In an air channel 1 the air is flowing therefore in the direction of arrows B, *i. e.* from right to left. It enters the air channel 1 in the section *a—b* and leaves it in the section *c—d*. Above the air channel a pipe system 2 is provided, which is supplied with water through a pumping plant 3ᵃ in such a way that a pressure above atmospheric is generated in the distributing pipes 2. In said distributing pipes comparatively few outlet openings 4 are provided from which the water is discharged at a comparatively high speed. In order to prevent it from flowing down too quickly and in too small a number of comparatively big water jets, below the distributing pipes 2 a first strainer plate 5 is provided. The water jets discharged from the pipes 2 with a comparatively high velocity strike against said strainer. The total water quantity spreads itself over the whole surface of the strainer as equally as possible, loses nearly completely its velocity possessed at the moment of striking against the strainer and issues now from the openings of the strainer 5 with a smaller initial velocity and forming many water jets arranged closely to each other. In the exemplification of the invention shown on the drawing, a second strainer 6 is provided at approximately half the height of the cooling zone which extends from the vertical section $e$—$f$ to the vertical section $g$—$h$ of the air channel, against which strainer the water jets strike again and lose again for the most part their velocity caused by the fall. At the same time the water is multifariously dispersed and diffused as spray. Out of thick jets many thinner jets are formed as well as a great many small particles of water flowing through the air, the water in the form of rain and fine spray offers to the air current a large surface for an effective absorption of heat. If the danger exists that with an excessive running speed and a thereby caused excessive speed of the air current the water might be carried away over the strainers 5 and 6 respectively in a horizontal direction toward the rear, this disadvantage can be avoided by placing the rear end (in Fig. 1 the left end) of the strainers somewhat higher than the front end. In this way an inclination may be given to the strainer thus causing gravity to impart to the water particles lying on the strainer a component directed toward the front which counterbalances the force directed toward the rear and caused by the air current on said water-particles.

On account of the water being supplied to the pipes 2 with a pressure above atmospheric it is made certain that these pipes are always filled and every opening equally supplied with water. For that reason an equally distributed water current falls down upon the first strainer 5 and the cooling zone extending from $e$—$f$ to $g$—$h$ is always equally supplied with rain-like distributed water, independently whether the vehicle is running on a horizontal, ascending or descending track. On account of a pressure above atmospheric prevailing in the pipes 2 comparatively few openings may be provided and to which on account of their small number such a large cross-sectional area may be given that the danger of their getting choked up is excluded. On account of the water forming a thin layer on the topmost strainer 5, the velocity of flow through this strainer is quite small. In order to have the prescribed quantity of water flowing through, many openings in the strainer are required, each of which must be of a comparatively large area to be assured against their being choked by impurities. The openings of the distributing pipes 2 and of the strainers may be so proportioned, that the cross-sectional area of the plurality of the individual openings in a strainer is at least twice as large as the total area of the same number of openings in the distributer and that the total area of all the openings of a strainer is at least twenty times as large as the area of all the distributer openings. As there are only one or at the most three strainers provided the air current is only slightly obstructed.

What I claim now as my invention is:

1. A water cooling device for steam driven vehicles comprising a longitudinally arranged channel, a water distributing member arranged above said channel and provided with openings, means to supply water at a pressure above atmospheric pressure to said distributing member, and substantially horizontally arranged means provided in the path of the distributed water, provided with larger openings and greater in number than the openings in the distributing member.

2. A water cooling device for steam driven vehicles comprising a longitudinally arranged channel, a water distributing member arranged above said channel and provided with openings, means to supply water at a pressure above atmospheric pressure, to said distributing member, a substantially horizontal perforated, baffling member provided in the path of the water leaving the distributing member and provided with larger openings greater in number than the openings in the distributing member.

3. A water cooling device for steam driven vehicles comprising a longitudinally arranged channel, a water distributing member arranged above said channel and provided with openings, means to supply water at a pressure above atmospheric pressure to said distributing member, a perforated baffling member having openings which are twice as large as the openings of the distributing member.

4. A water cooling device for steam driven vehicles comprising a longitudinally arranged channel, a water distributing member arranged above said channel and provided with openings, means to supply water at a pressure above atmospheric pressure to said distributing member, a substantially horizontal strainer plate provided in the path of the water leaving the distributing member, in the upper third of the cooling channel and provided with considerably larger and considerably more openings than the distributing member.

5. A water cooling device for steam driven vehicles comprising a longitudinally arranged channel, a water distributing member arranged above said channel and provided with openings, means to supply water at a pressure above atmospheric pressure, to said distributing member, a substantially horizontal strainer plate provided in the path of the water leaving the distributing member, in the upper third of the cooling channels, a substantially horizontal second strainer plate arranged at about half the height of the cooling zone, said strainer plates being provided with considerably larger and considerably more openings than the distributing member.

6. A water cooling device for steam driven vehicles comprising a longitudinally arranged channel, a water distributing member arranged above said channel and provided with openings, means to supply water at a pressure above atmospheric pressure to said distributing member, and a plurality of means provided in the path of the distributed water in the cooling channel arranged slightly raised in the direction of the air current and provided with considerably larger and considerably more openings than the distributing member.

In testimony that I claim the foregoing as my invention, I have signed my name.

CONRAD KOHLER.